(12) United States Patent
Domocsok (10) Patent No.: US 11,058,099 B2
(45) Date of Patent: Jul. 13, 2021

(54) BROOD COMB FRAME HAVING GRID RING FOR CYLINDRICAL CHAMBER HIVES

(71) Applicant: Bela Domocsok, Biatorbagy (HU)

(72) Inventor: Bela Domocsok, Biatorbagy (HU)

( * ) Notice: Subject to any disclaimer, the term of this patent is extended or adjusted under 35 U.S.C. 154(b) by 0 days.

(21) Appl. No.: 15/038,999

(22) PCT Filed: Nov. 26, 2014

(86) PCT No.: PCT/HU2014/000115
§ 371 (c)(1),
(2) Date: May 24, 2016

(87) PCT Pub. No.: WO2015/079275
PCT Pub. Date: Jun. 4, 2015

(65) Prior Publication Data
US 2017/0000092 A1    Jan. 5, 2017

(30) Foreign Application Priority Data

Nov. 29, 2013   (HU) .................................. P1300691

(51) Int. Cl.
*A01K 47/02* (2006.01)
*A01K 47/00* (2006.01)
(Continued)

(52) U.S. Cl.
CPC .............. *A01K 47/02* (2013.01); *A01K 47/00* (2013.01); *A01K 47/06* (2013.01); *A01K 49/00* (2013.01)

(58) Field of Classification Search
CPC ........ A01K 47/00; A01K 47/02; A01K 47/04; A01K 47/06; A01K 51/00
(Continued)

(56) References Cited

U.S. PATENT DOCUMENTS

| 93,395 A | * | 8/1869 | Atkinson | ............... A01K 47/00 |
| | | | | 449/36 |
| 611,746 A | * | 10/1898 | Winter | ................... A01K 47/02 |
| | | | | 449/42 |

(Continued)

FOREIGN PATENT DOCUMENTS

| GB | 586654 A | * | 3/1947 | ............. A01K 47/00 |
| GB | 619301 A | * | 3/1949 | ............. A01K 47/00 |

(Continued)

OTHER PUBLICATIONS

English-language translation of KR 100757995.*
English-language translation of KR 10-0665513 (Year: 2007).*

*Primary Examiner* — Lisa L Tsang
(74) *Attorney, Agent, or Firm* — Millen, White, Zelano & Branigan, PC; Ryan Pool (57) ABSTRACT

A grid ring brood comb frame for cylindrical brood chamber hives has a brood comb frame (20) carrying a comb (6), and the brood comb frame (20) is supplied with connection bodies (40) for connection to a rotating structure. A grid ring (30) is located at least partially around the external shell surface (21) of the brood comb frame (20) carrying the comb (6) and opposite the comb (6). The brood comb frame (20) and the grid ring (30) are connected to each other via connection sections (31), the grid ring (30) is supplied with a first edge (32) extending beyond a longitudinal external plane (S) resting on a side surface (22) of the brood comb frame (20). The connection sections (31) between the brood comb frame (20) and the grid ring (30) are interrupted by one or more bee spaces (34).

20 Claims, 3 Drawing Sheets

(51) Int. Cl.
*A01K 47/06* (2006.01)
*A01K 49/00* (2006.01)

(58) Field of Classification Search
USPC .............................. 449/3, 12, 26, 35–39, 42
See application file for complete search history.

(56) References Cited

U.S. PATENT DOCUMENTS

| | | | | | |
|---|---|---|---|---|---|
| 2,146,844 | A | * | 2/1939 | Panet | A01K 47/02 449/17 |
| 3,864,196 | A | * | 2/1975 | Schmidt | A01K 47/04 428/118 |
| 4,094,026 | A | * | 6/1978 | Simoni | A01K 47/00 449/21 |
| 4,185,343 | A | * | 1/1980 | Ross | A01K 47/02 449/17 |
| 4,402,099 | A | * | 9/1983 | Platt, Jr. | A01K 47/00 449/15 |
| 7,416,469 | B2 | * | 8/2008 | Clerkin | A01K 47/04 449/44 |
| 2008/0064298 | A1 | * | 3/2008 | Junqueira de Souza | A01K 47/06 449/2 |
| 2016/0029603 | A1 | * | 2/2016 | Heidinger | A01K 47/02 449/13 |
| 2017/0035033 | A1 | * | 2/2017 | Adams | A01K 47/02 |

FOREIGN PATENT DOCUMENTS

| | | | | |
|---|---|---|---|---|
| KR | 100665513 B1 | * | 1/2007 | |
| KR | 100757995 B1 | * | 9/2007 | A01K 47/02 |
| WO | WO-03007704 A1 | * | 1/2003 | A01K 47/02 |
| WO | WO-2008044082 A1 | * | 4/2008 | A01K 47/00 |
| WO | WO-2008061286 A1 | * | 5/2008 | A01K 47/02 |

\* cited by examiner

BROOD COMB FRAME HAVING GRID RING FOR CYLINDRICAL CHAMBER HIVES

The subject of the invention relates to a grid ring brood comb frame for cylindrical brood chamber hives which has a brood comb frame carrying the comb, and the brood comb frame is supplied with connection bodies for connection to the rotating structure.

People have been keeping bees for a long time. An important driving force behind beekeeping is the extraction of honey created by bees. In the interest of this, bee colonies are kept in artificially created hives, which make it possible to obtain honey produced by bees more easily. Over time numerous changes have taken place in the structure, construction and usage of the equipment, hives, combs and brood comb frames, used in the honey-production process.

A consequence of development serving honey production efficiency and protection of the bee colony against *varroa* mites is the change in the shape of the brood comb frames and in the method of their positioning, which was realized in rotating hives and then in hives applying rotatable brood comb frames. Patent specification registration number HU 223.065 presents a hive with such a rotatable brood chamber. The essence of this is that a rotatable frame structure is placed in the hive into which the individual combs and so the brood frames as well may be fixed, and following this the installed brood frames may be rotated as compared to the hive.

However, the disadvantage of the solution is that during the rotation of the brood frames some of the bees in the hive and even the queen may be injured or destroyed, which was unfavorable from the point of view of honey production, and in a given case even led to the loss of the entire colony. A further disadvantage is that due to the requirement of the rotating frame, the bees built burr-combs in the space of the hive brood chamber, and among the individual structural components of the hive the bees "glued together" the rotating part with the stationary part, which—apart from the bee destruction occurring due to the rotation—also caused operation problems.

An idea relating to overcoming this disadvantage may be seen in patent application specification base number HU P 03 04008. The essence of the solution is that a suitably structured insert body was inserted between the hive and the rotating frame, which creates gap dimensions around the brood chamber which is optimal for the bees, and so terminates the gluing or propilizing and the building activities as well.

The deficiency of the structure, however, is that a unique insert should be made for every single hive and rotating brood frame—due to their shape and dimension differences—which is, in this way, not possible to realize economically. A further disadvantage is that the construction does not really solve the problem of the injury and destruction of the bees, and in a given case the queen, occurring due to the rotation of the brood frames.

A further disadvantage of the solution is that the bees propilize the insert body covering their brood chamber to an exaggerated extent with imprecise bee spaces from the inside, with this making inspection of the brood chamber, the disassembly of the brood chamber and the removal of the frames difficult.

Another deficiency of the solution is that exits for the bees may only be formed in the side of the cover located opposite one another complying with the 180° rotation, the size of which openings necessarily does not only ensure passage for the worker bees but also for the drones and the queen also, which the queen easily finds, therefore, it does not comply with the requirement of selective movement and movement restriction.

Another important disadvantage of this solution is that it prevents the hive waste formed in the brood chamber and mainly the young mites coming out of the cells from frequently falling onto the bottom board, which undesirably improves the reproductive ability of the *varroa* mites, and also does not make more effective limitation of mites and the more frequent brood chamber rotation less than 180°.

Construction changes connected to hives are also known of that relate to the combs located in the brood comb frame. Patent specification registration number HU 186.696, for example, presents an artificial comb insert hive frame the essence of which is that the base pattern of the cells forming the frame and comb itself form a single unit made from plastic.

However, the disadvantage of the solution is that due to the prefabricated pattern the cells the bees wish to build, of differing sizes in a given case, are not positioned in a favourable arrangement, which causes difficulties for the development of the colony and from the point of view of the sex ratio.

A further disadvantage is that such a brood comb frame construction does not improve brood efficiency and it does not reduce the problems caused by pests.

Over and above honey production, bees are very useful from another point of view as well. This is fundamental cooperation in the pollination of crops. In the interest of better utilization of the genetic production potential of farm crops attractive for pollinating insects through reliable pollination, the increasing of the amount of produce and improving its quality, today it is preferable to separately ensure the replacement of the pollinating insects living in the wild, which is only effectively possible with the most productive animal species domesticated by man, with social insects living in populous colonies that have unparalleled diligence in foraging and that may be easily controlled, the so-called "western honey bee".

As a consequence of this it has also become necessary to develop an effective, new pollination technology that utilizes bees and that may be integrated into crop production technologies, which together create the possibility for thorough pollination and the associated, increased quality-honey production. Also besides making the work of the beekeeper easier it realizes the conditions for the careful keeping of biologically active, strong and healthy bee colonies—ensuring their support, protection and mobility.

Our objective with the solutions according to the invention was to overcome the deficiencies appearing in the case of the known rotating brood chamber hives and to establish brood comb frames that make it possible, without the use of further individual, supplementary structural elements, to prevent propilizing and burr-comb creation in the parts around the brood comb frames by the bees, and so that the rotation of the brood frames and their removal may take place in a simple way without unnecessarily disturbing the bees.

Furthermore, our objective was to reduce the injury and destruction of the bees during the rotation of the brood frames to a minimum and to essentially exclude injury to the queen, i.e. so that "bee lines changing" may take place in a safe way for the bees, even if it takes place during the moving of the brood frames.

Another objective set was that due to the novel structure of the bee cells of the combs placed in the grid ring brood comb frame, the brood efficiency should be improvable and also it should be possible to increase the population of the various members of the bee colony, also change the sex ratio in a favorable direction and also control it in a given case.

One of the bases of the idea behind the invention was formed by the consideration that in order to protect the bees changing bee lines in the brood chamber, especially the queen, the bee space making it possible to change beelines without injury must be constructed so that the space between the external shell of the brood comb frame and the wall of the brood space of the brood chamber must be divided into two parts with a new configuration of grid jacket structure surrounding the brood chamber and formed by so-called grid rings each separately cooperating with the brood comb frames. Placing the new-structured grid ring brood comb frame next to one another with the insertion of spacers a grid jacket cylindrical brood chamber structure is created in which the drones and the queen are only able to change between beelines through the bee spaces between the grid rings and the brood comb frames.

Another basis of the idea behind the invention was formed by the consideration that if the increased gap between the brood comb frame and the wall of the brood space is divided into two with the grid structure formed by the rings of the brood comb frames lined up next to one another, with the so-called grid jacket so that on both sides a gap according to the usual bee space is created, then the bees view the internal side of the grid jacket dividing the gap falling towards the external shell of the brood comb frame as the internal wall surface of the hive and not the wall of the brood space, therefore they only build burr-combs on the internal side of the grid jacket facing towards the brood chamber, and few of the worker bees go out to its external side and do not make bothersome constructions.

Another part of the idea behind the invention was that if bee spaces are created along the delimiting walls of the hive in an unusual way with the help of the novel structural elements, then the self-operating ventilation of the hive may also be solved, which significantly assists the nectar drying activity of the bees related to honey production, and so they are able to devote more energy to nectar foraging, and via this to the more intensive and reliable pollination of crops, as a result of which the task may be solved even more effectively.

The idea behind the invention also includes that in the case of the cell structure of ready combs a novel arrangement may also be applied that the bees are unable to build by themselves in an instinctive way, however, getting it "ready made" they accept it and only supplement it according to their demands, and so, via external control, the bees may be made to place the appropriate individual of the population, drone or worker egg into a cell that is sufficiently spacious for the characteristics of the population individuals and so with this the sex ratio of the colony may be controlled from the outside.

Another part of the idea behind the invention was formed by that if the bee cells lined up next to one another of the combs that may be inserted into the brood comb frame are formed with a geometrical shape different to that usually applied when making artificial comb foundations, with differing sizes in given sections, then the bees much more quickly create combs suitable for the brood with less energy investment, in which the brood takes place under better conditions, with less exposure to the risk of infection, and, in a given case, with a controlled number of individuals and sex ratio of the individual bees appearing among the progeny, and so the bees are able to devote more energy to nectar foraging and, along with this, to the pollination of the plants in the vicinity, and therefore this activity will be more effective and through this the task becomes solvable at an even better standard.

Therefore, on the basis of the previous considerations and thoughts the recognition that led to the structure according to the invention was that if the brood comb frame is formed in a novel way so that the external edge of the brood comb frame is supplemented with a grid ring forming a novel geometric configuration, and in the gap between the grid ring and the brood comb frame, at specific locations, bee spaces are created that ensure access from the one side of the brood comb frame to the other, then with the grid ring brood comb frames set up in this way lined up next to one another, a rotatable brood chamber structure is created in the case of which the queen and the drones are only able to and only want to travel in a controlled way along only specific routes, and in the vicinity of the pathways accessible to the worker bees, the bees do not want to propilize or build in the bee spaces between the rotating brood chamber and the hive, and so the task may be solved.

In accordance with the set aim the grid ring brood comb frame for cylindrical brood chamber hives according to the invention—which has a brood comb frame carrying the comb, and the brood comb frame is supplied with connection bodies for connection to the rotating structure—is set up in such a way that a grid ring is located at least partially running around the external shell surface of the brood comb frame carrying the comb opposite to the comb, where the brood comb frame and the grid ring are connected to each other via connection sections, the grid ring is supplied with a first edge extending beyond the longitudinal external plane resting on the first side surface of the brood comb frame, the height of the first edge measured from the longitudinal external plane of the brood comb frame is between 1-8 mm, furthermore the connection sections between the brood comb frame and the grid ring are interrupted by one or more bee spaces, where the radial dimension of the bee space is between 4-25 mm.

A further feature of the grid ring brood comb frame according to the invention may be that the grid ring has a second edge extending beyond the longitudinal external plane resting on the second side surface of the brood comb frame, and the height of the second edge measured from the longitudinal external plane resting on the second side surface of the brood comb frame is between 1-8 mm.

In the case of another version of the grid ring brood comb frame the number of connection bodies belonging to one grid ring brood comb frame is three, where the individual connection bodies are arranged in the vicinity of the external side of the grid ring at a centre-point angle of 80-160° from each other.

In the case of another, different embodiment of the invention the first connection body is supplied with a stop piece, while apart from this at least one further connection body has a locking piece suitable for receiving the hive's brood frame support. One of the connection bodies has a support piece suitable for connecting to the rotation axle serving to swing out the grid ring brood comb frame.

In the case of yet another, different embodiment of the grid ring brood comb frame, the grid ring brood comb frame is coupled with a sealing body, where the sealing body is supplied with an internal surface suiting the size and shape of the edge located on the grid ring of the grid ring brood comb frame, facing the direction of the edge. When the grid ring brood comb frame and the sealing body are in their installed position the internal gap-distance between the external rim of the first edge of the grid ring brood comb frame and the external rim of the second edge of the grid ring brood comb frame is between 2-12 mm, and the external gap-distance between the external rim of the first edge of the grid ring brood comb frame or the external rim of the second edge of the grid ring brood comb frame and the internal surface of the sealing edge of the sealing body is between 4-15 mm.

In the case of another embodiment of the invention the grid ring has at least three spacer pieces protruding from the first edge and/or the second edge of the grid ring, where the individual spacer pieces are regularly arranged along the given edge of the grid ring.

In the case of another different version of the grid ring brood comb frame the brood comb frame has an internal cavity, a heating part-unit is located in the internal cavity, and the heating part-unit has a heating element made from electrical resistance wire and connection extensions leading out to the external shell surface of the brood comb frame.

From the point of view of the invention it may be preferable if the comb located in the brood comb frame is at least partially formed from a multitude of bee cells delimited by a cell wall with a regular hexagonal cross-section and cell base, at least some of the cell walls are formed as a pre-pressed wax design with a 12 μm wall thickness, where the protrusion of at least some of the cell walls formed from the wax design is at least 3 mm, and the longitudinal axis of the hexagonal cross-section cell wall is in a perpendicular position to the main plane of the ready comb.

In the case of another different embodiment of the grid ring brood comb frame among the bee cells forming the comb, bee cells with differing size of cross-sectional area and/or shape are arranged in the inner zone of the comb and in the outer zone of the comb, and the size of the cross-sectional area of the bee cells located in the inner zone is greater than the size of the cross-sectional area of the bee cells located in the outer zone.

In the case of a different embodiment of the invention, stiffening inserts are located scattered in the beeswax forming the material of the ready comb.

The grid ring brood comb frame according to the invention has numerous advantageous characteristics. The most important among these is that due to the unusual structure of the external part of the brood comb frame, the rotating brood chamber built from the novel brood comb frames protects the bees from being injured or destroyed in large numbers during the rotation, movement of the brood chamber, and protects the queen from injuries and so keeps the colony together, therefore the strength and size of the bee colony in the given hive may continuously increase, as a consequence of which the honey-production ability of the colony is maintained and may increase to a significant extent.

A further advantage is that due to the unique geometric arrangement of the brood comb frames and the arrangement of the hive and the brood comb frames as compared to each other, the bees working in the brood comb frame and in its vicinity do not build or propilize in this part of the hive, and so the blocking of the moving elements of the hive, the involved probability of faults and the damage to certain components may be significantly reduced.

Another advantage to be listed is that with the application of the grid ring brood comb frame according to the invention the proliferation of *varroa* mite can be effectively prevented without using chemicals, therefore the colony has a larger, healthier and stronger population, consists of bees with greater vitality and so the honey-production ability of the colony increases even further.

In connection with defence against pests and diseases an advantage originating from the structure of the comb according to the invention is that its application in the grid ring comb brood frames makes more regulated reproduction in the bee colony possible also from the point of view of the number of individuals and sex ratio, and also increases the productivity of the bee colony by that due to the combination of the size of the bee cells and their unusual shape the body size of the individuals developing in the bee cells will be appropriate for their type.

Due to the appropriate number of regulated sized bee cells and their arrangement within the brood chamber the adjustment of the sex ratio of worker bees and drones may controlled to good effect, the advantage or which is that the sex composition of the colony, the continuous presence of the precisely appropriate number of drones may be more favorable in the interest of maintaining good colony moral than if all this were entrusted to the bees acting upon instinct. With the cells forming the cell structure of the ready combs used in the brood chamber with varying widths and arrangement, the egg-laying of the queen, the sex ratio of the individuals of the colony becomes controllable by establishing drone and worker, or just drone or just worker cell groups in the ready combs in the number, size and location according to the intention of the beekeeper and then by making this available to the colony.

Another advantage of the ready comb according to the invention is that it makes a more effective method of biotechnological defense against the damage caused by *varroa* mites, when the drone cells, which are more appropriate for the reproduction of the *varroa* mites, reduced in number to the minimum required from the point of view of the colony, are located in the wannest part of the brood chamber, which is not favorable for the *varroa* mite and so by this an important life condition from the point of view of the development of the *varroa* mite is damaged.

The ready comb according to the invention is preferable for the family and from the point of view of the technology because in the interest of improving brood chamber comfort the cell walls are thicker and stronger than is natural, and the longitudinal axis of the cells is always parallel with the axis of rotation during rotation, they are perpendicular to the plane of the comb midrib, which, on the one hand, may play an important role in the biological defense against the *varroa* mite, and, on the other hand, ensures that healthy individuals with an appropriate body size develop from the cells, which may greatly improve the productivity of the bee colony.

Another feature belonging among the advantages is that in rotating brood chambers built from the brood comb frames with their unique geometric structure and that precisely-sized bee spaces may be established between the brood comb frames and the delimiting shell of the hive, which makes it possible to appropriately separate the routes accessible to the workers, the drones and the queen, and this may have a favorable effect on the life and productivity of the bee colony.

Another feature to be counted among the advantages is that the brood comb frame according to the invention has a simple structure, consists of a small number of components, which can be easily made using traditional production technology, furthermore, the assembly of the individual structural units, their disassembly and replacement may be performed without any difficulty. Therefore, the investment and operation costs may be maintained at a moderate level.

The advantage of the heating part-unit located in the internal cavity of the brood comb frame is that it may provide assistance in making the brood comb frame free of pests, as well as in the establishment and maintenance of balanced climatic conditions in the hive.

A further advantage deriving from the application of the solution according to the invention is that it makes it easier for the bees to maintain optimal and even brood chamber temperature and humidity, it provides effective defense for the colony brood chamber and the queen against attacks by foreign bees, it does not prevent the hive waste and the young mites emerging from the cells from falling onto the bottom board under the grid sealing off the space under the brood chamber, or the inspection of the hive waste and the brood chamber without disassembly.

All these advantages together result in that advantage that the healthier and stronger bees are able to devote greater energy to the gathering task, as a consequence of which appropriate pollination of the crops may also be realised, which may significantly improve agricultural productivity and the value of the produce.

The grid ring brood comb frame according to the invention is presented in more detail in the following drawings.

Figure 1:
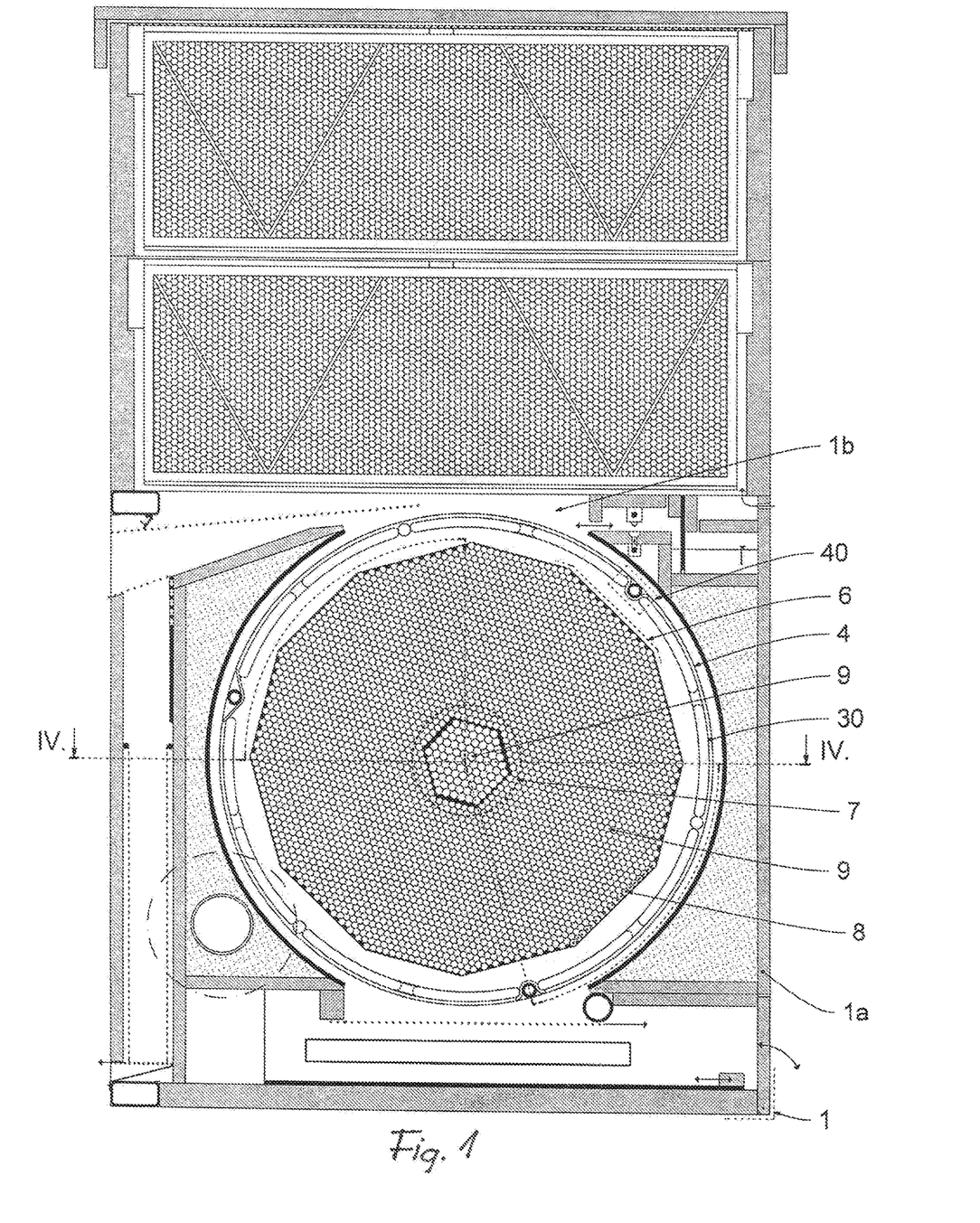
FIG. 1 is a cross-sectional side-view picture of a possible version of a cylindrical brood chamber hive using the grid ring brood comb frame according to the invention.

In FIG. 1 the longitudinal cross-section picture of a hive 1 also containing the grid ring brood comb frame 4 according to the invention may be seen. It may be observed that the delimiting shell 1a of the hive 1 encloses the brood chamber cavity 1b, in which the grid ring brood comb frames 4 accommodating the comb 6 bordered by the grid ring 30 are located. The grid ring brood comb frames 4 are connected to the rotation structure 4a—illustrated in FIG. 4—connected to the delimiting shell 1a of the hive 1 so that it may rotate with the mediation of the connection bodies 40 associated with the grid ring 30.

FIG. 1 also shows that the cross-sectional size of the bee cells 9 of the comb 6 located in the grid ring 30 of the grid ring brood comb frame 4 is larger in the inner zone 7 of the comb 6 than in the outer zone 8 of the comb 6.

Figures 2, 3:
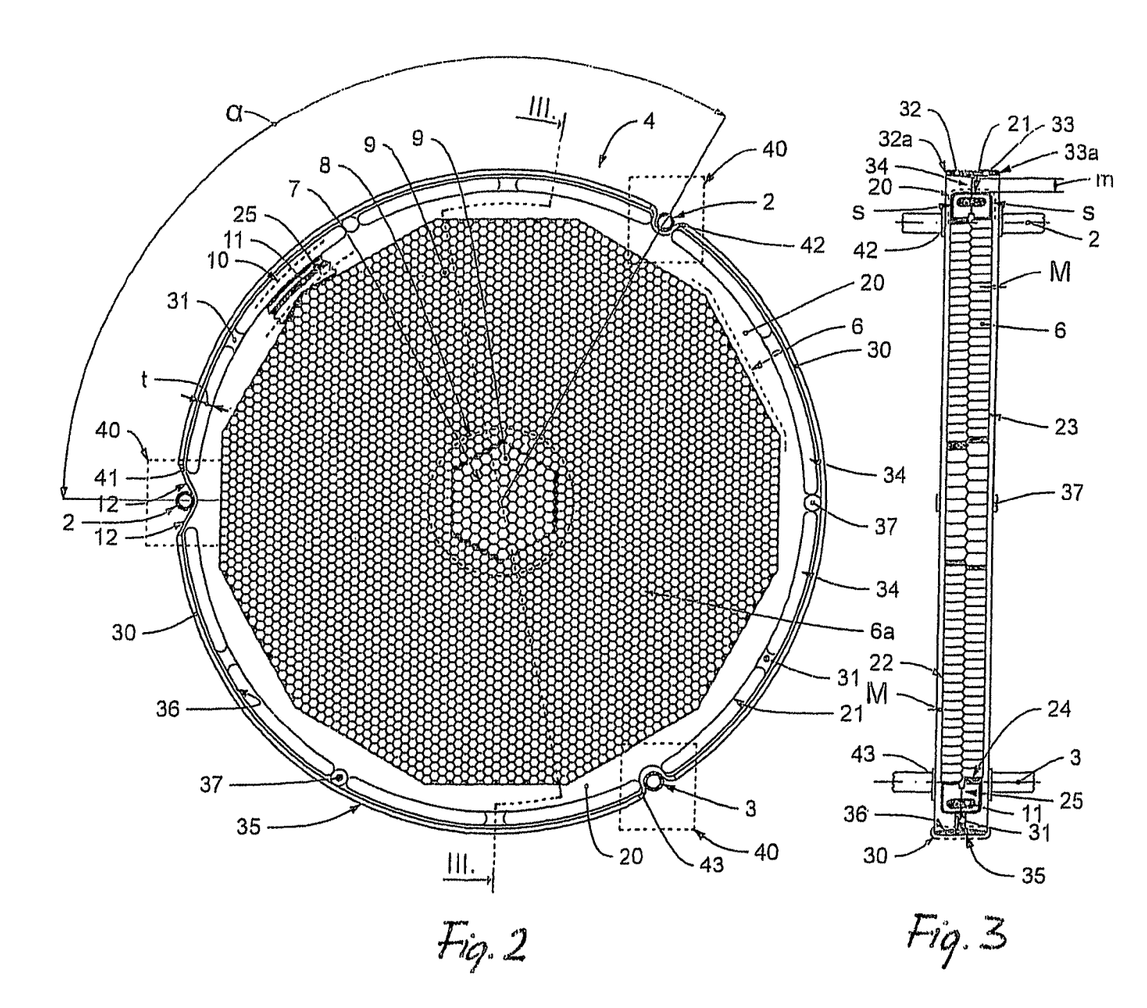
FIG. 2 shows the front view picture of a version of the grid ring brood comb frame.
FIG. 3 shows the cross-section taken on the plane according to FIG. 2.

FIGS. 2 and 3 show a possible version of the grid ring brood comb frame 4 according to the invention. It may be observed that the comb 6 is located in the circular ring shaped brood comb frame 20 in the usual way, which in this case is made from a natural material, beeswax. The grid ring brood comb frame 4 according to the invention fundamentally differs from the known versions in that the grid ring 30 encompasses the brood comb frame 20 of the grid ring brood comb frame 4 on the external shell surface 21 of the brood comb frame 20 in such a way that the connection sections 31 are located between the external shell surface 21 of the brood comb frame 20 and the internal side 36 of the grid ring 30. The connection sections 31 ensure a permanent sized gap "t" of at least four millimeters but at the maximum twelve millimeters between the external shell surface 21 of the brood comb frame 20 and the internal side 36 of the grid ring 30. The size of the gap "t" in this case is eight millimeters.

Here the brood comb frame 20, the grid ring 30 and the connection sections 31 are made of a single material, plastic, by injection molding.

FIG. 3 well illustrates that, between the connection sections 31 connecting the brood comb frame 20 to the grid ring 30, there are bee spaces 34 bordered by the external shell surface 21 of the brood comb frame 20 and the internal side 36 of the grid ring 30, and by two sets of two neighboring connection sections 31 arranged in a specific order along the external shell surface 21 of the brood comb frame 20. The radial size "m" (see FIG. 3) of these bee spaces 34 is between 4-12 mm, in the interest of the drones, the workers and the queen being able to pass through them from the first side surface 22 of the brood comb frame 20 of the grid ring brood comb frame 4 to the second side surface 23. The first side surface 22 and the second side surface 23 of the brood comb frame 20 actually form two constructed bee cell structured sides of the comb 6 located in the brood comb frame 20. In this case the radial size "m" (FIG. 3) of the bee spaces 34 and the gap "t" (FIG. 2) ensured by the connection sections 31 are the same.

FIG. 3 also illustrates that the grid ring 30 has a first edge 32 protruding from the external plane "S" resting on the first side surface 22 of the brood comb frame 20. Here the height "M" of the first edge 32 from the first side surface 22 of the brood comb frame 20 to the external rim 32a of the first edge 32 may be between 1-8 mm. It may also be observed that—in the case of this version—the grid ring 30 has a second edge 33 protruding from the external plane "S" falling on the second side surface 23 of the brood comb frame 20. The height "M" of this second edge 33 between the external plane "S" of the second side surface 23 of the brood comb frame 20 and the external rim 33a of the second edge may also be between 1-8 mm.

The internal shell surface 24 of the brood comb frame 20 facing the comb 6 is structured in such a way that it is easily capable of accommodating and retaining the comb 6. Here it must be noted that, in the interest of the simple and secure retention of the comb 6, the brood comb frame 20 forming a single unit with the grid ring 30 may consist of two or more pieces. In the case of this embodiment of the brood comb frame 20, the grid ring 30 unit is preferably constructed from two halves, which two halves enclose the central wall of the comb 6.

In the case of the given embodiment, referring to FIG. 2, the internal cavity 25 may be found in the part delimited by the two half pieces of the brood comb frame 20, which internal cavity 25 contains the heating part-unit 10. The heating part-unit 10 consists of a heating element 11 and of connection extensions 12. Here the heating element 11 runs completely around the torus-like internal cavity 25 of the brood comb frame 20. Also the connection extensions 12 run out in the vicinity of the stop piece 41 to the external side 35 of the grid ring 30 of the brood comb frame 20 in the interest of being able to feed an electric current into the heating element 11 of the heating part-unit 10 in the internal cavity 25 of the brood comb frame 20. In this way, with the help of a suitable control device, the heating element 11 of the heating part-unit 10 is capable of slowly, precisely heating the cylindrical brood chamber 38 and the entire brood chamber of the hive 1—indicated in FIG. 4—and of maintaining it in the given, narrow temperature range, with the help of which pest control is also solved.

Returning now to FIG. 2, on it, it can be seen that the grid ring 30 in the present embodiment, the connection bodies 40 are located in the vicinity of the external side 35 of the grid ring 30, the task of which is to keep together the grid ring brood comb frames 4 lined up next to one another as a single unit. Among the connection bodies 40, the first—which in this case is located on the left side of FIG. 2—is the stop piece 41, the second is the locking piece 42 and the third is the supporting piece 43. The task of the stop piece 41 is to retain the given grid ring brood comb frame 4 with the help of the brood frame support 2 cooperating with it, and to not permit it to tilt to the left around the rotation axle 3 fitted into the supporting piece 43. The task of the supporting piece 43 is, in cooperation with the rotation axle 3 threaded into it—in the case of the arrangement visible in FIG. 2—to make it possible for the grid ring brood comb frame 4 to rotate around the rotation axle 3 to the right when the brood frame support 2 is not positioned in the locking piece 42. The locking piece 42 serves to retain the grid ring brood comb frame 4 in its "operation" position in the case of the positioning of the brood frame support 2 threaded through it while, when the brood frame support 2 is in its pulled-out state, it is to make it possible for the grid ring brood comb frame 4 to tilt to the right around the rotation axle 3 in the supporting piece 43—in the state shown in FIG. 2.

It may also be easily seen in FIG. 2 that the stop piece 41, the locking piece 42 and the supporting piece 43 of the connection bodies 40 are located at a centre-point angle "α" of 120° as compared to one another. Naturally, an arrangement deviating from that presented in FIG. 2 may also be imagined, the essence being for the brood frame supports 2 and the rotation axle 3 to be located around the grid ring 30 of the grid ring brood comb frames 4 so that the grid ring brood comb frames 4 are easily and securely fixed to one another, but in the interest of the handling of the individual grid ring brood comb frames 4, so that their removal may be realized simply and quickly.

The spacer pieces 37 of FIG. 2 are also located next to the connection bodies 40 around the grid ring 30 of the grid ring brood comb frame 4. These spacer pieces 37 may be combined with the connection bodies 40 but they may also be independent as well. In any case, their task is to fix the grid ring brood comb frames 4 located next to one another in the desired position.

FIG. 2 also illustrates that, in this case, the comb 6 is made from a natural material, here from beeswax 6a. It may be seen that the cross-section size of the bee cells 9 in the inner zone 7 of the comb 6 is greater than the cross-section size of the bee cells 9 in the outer zone 8 of the comb 6. Here, the bee cells 9 for drones are located in the inner zone 7 of the comb 6 and the bee cells 9 suitable for worker bees are located in the outer zone 8 of the comb 6. There is a transitional ring running between the inner zone 7 and the outer zone 8. Here it must be noted that the size of the inner zone 7 and the size of the outer zone 8, and the ratio of their surfaces as compared to each other determines the development of the sex ratio of the bee colony after the development of the eggs of the comb 6, also influencing the given sex ratio.

Figure 4:
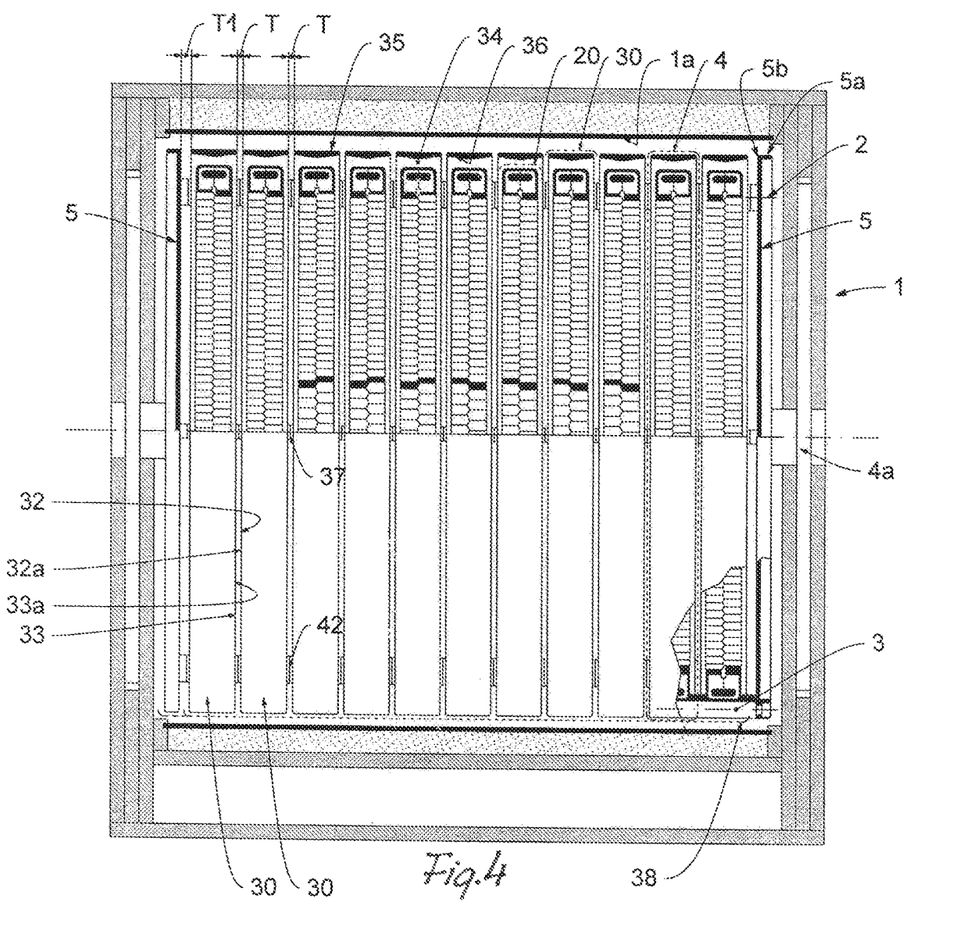
FIG. 4 shows the cross-section taken on the plane IV-IV of the grid ring brood comb frames assembled in a cylindrical brood chamber hive according to FIG. 1.

Moving over to FIG. 4, this presents an arrangement in the case of which the grid ring brood comb frames 4 are lined up next to one another with the help of the brood frame supports 2 and the rotation axle 3, and in this way they are located in the rotation structure 4a, which is connected to the delimiting shell 1a of the hive 1.

It may be seen from FIGS. 2 and 4 that, between two neighboring grid ring brood comb frames 4, as a result of the spacer pieces 37 resting on one another, an internal gap distance "T" is formed between the first edge 32 of the grid ring 30 of the one grid ring brood comb frame 4 and the second edge 33 of the grid ring 30 of the neighboring other grid ring brood comb frame 4, the value of which between the external rim 32a of the first edge 32 and the external rim 33a of the second edge 33 is in the range of 2-12 mm. but preferably 4.2 mm.

It may also be seen in FIG. 4 that, beside the grid ring brood comb frames 4, at each of the two outermost positions there is a sealing body 5 threaded in the cylindrical brood chamber 38 installed in the hive 1 with the help of the brood frame supports 2 and the rotation axle 3. The sealing body 5 has a sealing edge 5a, the size and shape of which conforms to the first edge 32 and to the second edge 33 of the grid ring brood comb frame 4 next to it. The external gap distance "Tl" between the internal surface 5b of the sealing edge 5a of the sealing body 5 and the external rim 32a of the first edge 32 of the neighboring grid ring brood comb frame 4 or the external rim 33a of the second edge here is in the range of 4-15 mm, but preferably 8 mm.

Figure 5:
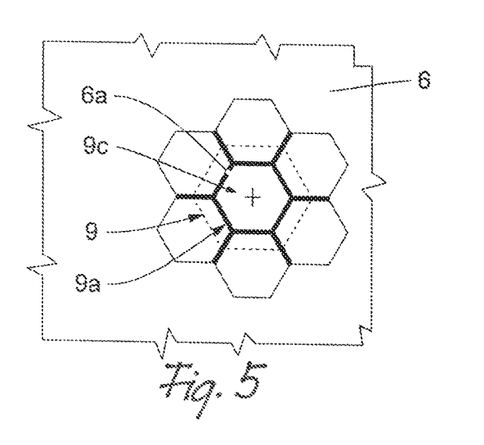
FIG. 5 is a detailed front view picture of the comb visible in FIG. 2.

In FIG. 5—and as presented in FIG. 2—the front view of a piece of the comb 6 located in the brood comb frame 20 belonging to the grid ring brood comb frame 4 may be seen. It may be observed that the comb 6, which in this case is made from a natural material, from beeswax 6a, is constructed from bee cells 9 which have a regular hexagonal cross-sectional bee cell wall 9a and a cell base 9c bordering it from the bottom.

Figure 6:
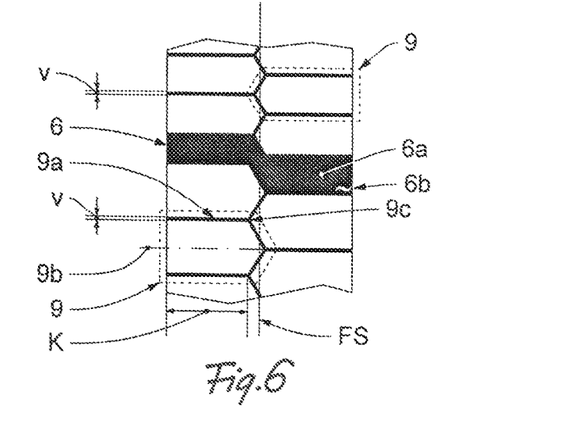
FIG. 6 is a detailed view of the comb visible in FIG. 3.

FIG. 6 presents a detailed view of the cross-section of the comb 6 according to FIG. 3. Here, the bee cells 9 lined up next to one another are easily visible; these are formed from the set of cell walls 9a and cell bases 9c. It may also be easily observed that the longitudinal axis 9b of the bee cell 9 and the main plane "FS" of the comb 6 are perpendicular to one another. The longitudinal axis 9b is, at the same time, the axis of symmetry of the cell wall 9a as well. The wall thickness "V" of the cell wall 9a of the bee cell 9 here is at least 12 μm, while the protrusion "K" of the cell wall 9a from the main plane "FS" of the comb 6 is at least 6 mm. Such combs 6 with a cell structure preferably established from a natural material, beeswax 6a, with such geometrical dimensions on the basis of acquired experience are suitable for the bees to accept them, complete them, adjust them and use them. It is also an important circumstance that stiffening inserts 6b are located in the natural material of the comb 6, which further improves the usability of the comb 6.

Referring to FIGS. 1 thru 4, in a hive 1 fitted with the solutions according to the invention, during the use of the grid ring brood comb frame 4, first of all it is possible to install the individual grid ring brood comb frames 4 lined up next to one another between the stably fitted left-side brood frame support 2 connected with the sealing bodies 5 located in the hive 1 and connected to the rotation structure 4a—with respect to the status according to FIG. 2—and the rotation axle 3, and then thread them with the help of the right side brood frame support 2. Following this, the cylindrical brood chamber 38 consisting of the grid ring brood comb frames 4, the two sealing bodies 5, as well as the brood frame supports 2 and the rotation axle 3, threading these is now fitted in the hive 1 so that it may even rotate.

In order to inspect, handle or just to view a given grid ring brood comb frame 4, the brood frame support 2 fitted into the locking piece 42 and fixed in the sealing bodies 5 must be removed from the locking piece 42. At this time, the given grid ring brood comb frame 4 may be swung out from among the rest of the grid ring brood comb frames 4 around the rotation axle 3 running through the supporting piece 43 (see FIG. 3), and in this way the sides of the comb 6 of the given grid ring brood comb frame 4 may be inspected from the aspect of the first side surface 22 and the second side surface 23 (see FIG. 3) of the brood comb frame 20. After inspection the given grid ring brood comb frame 4 may be swung back around the rotation axle 3 (FIG. 3) until the stop piece 41 located on the grid ring 30 of the grid ring brood comb frame 4 reaches the brood frame support 2, where it stops.

With the grid ring brood comb frame 4 in this position the locking piece 42 (see FIG. 4) of the grid ring brood comb frame 4 gets into a coaxial position with the locking pieces 42 of the other grid ring brood comb frames 4, and in this way the brood frame support 2 may again be fitted into the locking piece 42 of the swung back grid ring brood comb frame 4, and in this way the given grid ring brood comb frame 4 may be fixed.

The grid ring brood comb frame 4 according to the invention and the novel structured comb 6 may be used to good effect in all cases when, in the case of rotating cylindrical brood chamber hives, it is desired to have easy, fast and safe brood chamber handling, the protection of the individuals of the bee colony in the hive, the planned regulation of the sex ratio of the colony and the strengthening and effective productivity of the colony.

LIST OF REFERENCES 1 hive
1a delimiting shell
1b brood chamber cavity
1c side
1d side
1e connection piece
1f side
1g side
1h supporting body
2 brood frame support
3 rotation axle
4 grid ring brood comb frame
4a rotating structure
5 sealing body
5a sealing edge
5b internal surface
6 comb
6a beeswax
6b stiffening insert
7 inner zone
8 outer zone
9 bee cell
9a cell wall
9b longitudinal axis
9c cell base
10 heating part-unit
11 heating element
12 connection extension
20 brood comb frame
21 external shell surface
22 first side surface
23 second side surface
24 internal shell surface
25 internal cavity
30 grid ring
31 connection section
32 first edge
32a external rim
33 second edge
33a external rim
34 bee space
35 external side
36 internal side
37 spacer piece
38 cylindrical brood chamber
40 connection body
41 stop piece
42 locking piece
43 supporting piece
"FS" main plane
"K" protrusion
"m" size
"M" height
"S" external plane
"t" gap
"T" gap distance
"V" wall thickness
"α" centre-point angle

The invention claimed is:

1. A brood comb frame for cylindrical brood chamber hives, the brood comb frame carrying a comb and being supplied with connection bodies for connection to a rotating structure, wherein the brood comb frame is supplemented with a grid ring, the grid ring is located at least partially surrounding the brood comb frame carrying the comb and opposite to the comb, the brood comb frame and the grid ring being attached and connected to each other via connection sections, the grid ring being supplied with a first edge extending beyond a longitudinal external plane resting on a first side surface of the brood comb frame, wherein a height of the first edge measured from the longitudinal external plane of the brood comb frame is in a range of 1-8 mm, and the connection sections attaching and connecting the brood comb frame and the grid ring are spaced apart from each other by at least one bee space, said at least one bee space comprising an empty space containing bees and letting bees go through, and wherein a radial dimension of said at least one bee space is in a range of 4-25 mm.

2. The brood comb frame according to claim 1, wherein the grid ring has a second edge extending beyond a longitudinal external plane resting on a second side surface of the brood comb frame, and a height of the second edge measured from the longitudinal external plane resting on the second side surface of the brood comb frame is in a range of 1-8 mm.

3. The brood comb frame according to claim 2, wherein a number of the connection bodies belonging to the brood comb frame is three and each of the connection bodies is disposed on an external side of the grid ring and is spaced apart from an adjacent connection body of the connection bodies by a centre-point angle (a) in a range of 80-160° from each other.

4. The brood comb frame according to claim 3, wherein a first connection body of the connection bodies is supplied with a stop piece while a second connection body of the connection bodies has a locking piece for receiving a brood frame support of the cylindrical brood chamber hives.

5. The brood comb frame according to claim 4, wherein a third connection body of the connection bodies has a supporting piece for connection to a rotation axle so as to make it possible for the brood comb frame to rotate around the rotation axle.

6. The brood comb frame according to claim 5, wherein the brood comb frame is coupled with a sealing body, and the sealing body is supplied with an internal surface corresponding to a size and shape of the first and second edges of the grid ring of the brood comb frame, and the internal surface of the sealing body is parallel to the first and second edges.

7. The brood comb frame according to claim 4, wherein the brood comb frame is coupled with a sealing body, and the sealing body is supplied with an internal surface corresponding to a size and shape of the first and second edges of the grid ring of the brood comb frame, and the internal surface of the sealing body is parallel to the first and second edges.

8. The brood comb frame according to claim 2, wherein the brood comb frame is coupled with a sealing body, and the sealing body is supplied with an internal surface corresponding to a size and shape of the first and second edges of the grid ring of the brood comb frame, and the internal surface of the sealing body is parallel to the first and second edges.

9. The brood comb frame according to claim 8, wherein an internal gap-distance (T) between an external rim of the first edge of the grid ring of the brood comb frame and an external rim of a second edge of a grid ring of an adjacent brood comb frame is in a range of 2-12 mm, and an external gap-distance between at least one of the external rim of the first edge of the brood comb frame and the external rim of the second edge of the adjacent brood comb frame, and an internal surface of a sealing edge of the sealing body, is in a range of 4-15 mm.

10. The brood comb frame according to claim 1, wherein a number of the connection bodies belonging to the brood comb frame is three, and each of the connection bodies is disposed on an external side of the grid ring and is spaced apart from an adjacent connection body of the connection bodies by a centre-point angle (a) in a range of 80-160° from each other.

11. The brood comb frame according to claim 10, wherein a first connection body of the three connection bodies is supplied with a stop piece while a second connection body of the three connection bodies has a locking piece for receiving a brood frame support of the cylindrical brood chamber hives.

12. The brood comb frame according to claim 11, wherein a third connection body of the three connection bodies has a support piece for connection to a rotation axle serving to rotate the brood comb frame.

13. The brood comb frame according to claim 10, wherein the brood comb frame is coupled with a sealing body, and the sealing body is supplied with an internal surface corresponding to a size and shape of an edge located on the grid ring of the brood comb frame.

14. The brood comb frame according to claim 1, wherein the brood comb frame is coupled with a sealing body, and the sealing body is supplied with an internal surface corresponding to a size and shape of an edge located on the grid ring of the brood comb frame.

15. The brood comb frame according to claim 14, wherein an internal gap-distance (T) between an external rim of the first edge of the grid ring of the brood comb frame and an external rim of a second edge of a grid ring of an adjacent brood comb frame is in a range of 2-12 mm, and an external gap-distance between at least one of the external rim of the first edge of the brood comb frame and the external rim of the second edge of the adjacent brood comb frame, and an internal surface of a sealing edge of the sealing body, is in a range of 4-15 mm.

16. The brood comb frame according to claim 1, wherein the grid ring has at least three spacer pieces mounted therein, and wherein each of the spacer pieces is arranged at an interval along the grid ring.

17. The brood comb frame according to claim 1, wherein the brood comb frame has an internal cavity and a heating part-unit located in the internal cavity, and the heating part-unit has a heating element made from an electrical resistance wire and connection extensions leading out to the external shell surface of the brood comb frame.

18. A brood comb frame, for cylindrical brood chamber hives, the brood comb frame carrying a comb and being supplied with connection bodies for connection to a rotating structure, wherein the brood comb frame is supplemented with a grid ring, the grid ring is located at least partially surrounding the brood comb frame carrying the comb and opposite to the comb, the brood comb frame and the grid ring being attached and connected to each other via connection sections, the grid ring being supplied with a first edge extending beyond a longitudinal external plane resting on a first side surface of the brood comb frame, wherein a height of the first edge measured from the longitudinal external plane of the brood comb frame is in a range of 1-8 mm, and the connection sections attaching and connecting the brood comb frame and the grid ring are spaced apart from each other by at least one bee space, and wherein a radial dimension of said at least one bee space is in a range of 4-25 mm;

wherein the comb is at least partially formed from bee cells, each of the bee cells being delimited by a cell wall having a hexagonal cross-section and a cell base, at least some of the cell walls being formed as a pre-pressed wax design with a wall thickness CY) of 12 µm, wherein at least some of the cell walls each have a protrusion (K) formed from the pre-pressed wax design and the protrusion is at least 3 mm, and wherein a longitudinal axis of the cell wall having the hexagonal cross-section is in a perpendicular position relative to a main plane (FS) of the comb; and wherein, among the bee cells forming the comb, bee cells with differing sizes of cross-sectional area and/or shape are arranged in an inner zone of the comb as contrasted with an outer zone of the comb, and a size of the cross-sectional area of each of the bee cells located in the inner zone is greater than a size of the cross-sectional area of each of the bee cells located in the outer zone.

19. The brood comb frame according to claim 1, wherein a material of the comb is formed by beeswax, and stiffening inserts are located scattered in the beeswax forming the material of the comb.

20. A brood comb frame for cylindrical brood chamber hives, the brood comb frame carrying a comb and being supplied with connection bodies for connection to a rotating structure, wherein a grid ring is located at least partially surrounding the brood comb frame carrying the comb and opposite to the comb, the brood comb frame and the grid ring being connected to each other via connection sections, the grid ring being supplied with a first edge extending beyond a longitudinal external plane resting on a first side surface of the brood comb frame, wherein a height of the first edge measured from the longitudinal external plane of the brood comb frame is in a range of 1-8 mm, and the connection sections connecting the brood comb frame and the grid ring are interrupted by at least one bee space, and wherein a radial dimension of said at least one bee space is in a range of 4-25 mm; and wherein the comb is at least partially formed from bee cells and, among the bee cells forming the comb, bee cells with differing sizes of cross-sectional area and/or shape are arranged in an inner zone of the comb as contrasted with an outer zone of the comb, and a size of the cross-sectional area of each of the bee cells located in the inner zone is greater than a size of the cross-sectional area of each of the bee cells located in the outer zone.

* * * * *